United States Patent [19]

Jägers

[11] 4,164,883
[45] Aug. 21, 1979

[54] GUIDE FOR A SAWBLADE

[76] Inventor: Leopold Jägers, Rudolf-Diesel-Strasse 1, 5350 Euskirchen, Fed. Rep. of Germany

[21] Appl. No.: 841,445

[22] Filed: Oct. 12, 1977

[30] Foreign Application Priority Data

Oct. 15, 1976 [DE] Fed. Rep. of Germany ....... 2646515

[51] Int. Cl.$^2$ ............................................ B23D 45/02
[52] U.S. Cl. ...................................... 83/488; 83/821
[58] Field of Search .................................. 83/488, 821

[56] References Cited

U.S. PATENT DOCUMENTS

| | | | |
|---|---|---|---|
| 3,313,193 | 4/1967 | Orendi | 83/488 |
| 3,625,102 | 12/1971 | Shiino | 83/488 X |
| 4,054,072 | 10/1977 | Jagers | 83/488 |

*Primary Examiner*—Willie G. Abercrombie
*Attorney, Agent, or Firm*—Haseltine, Lake & Waters

[57] ABSTRACT

A machine for the cold sawing of workpieces, particularly those made of metal, in which a vertical feed of a circular vertical saw blade is guided vertically by gliding elements adhering laterally to the saw blade. The gliding elements are guided movably relative to the saw blade of a drive for the blade, parallel to the plane of the saw blade. The gliding elements may be located above the workpieces, and they may be fastened by carrier to vertical or inclined straight guides. These gliding elements, furthermore, may be fastened to guides with a curved guide track. The guides may be fastened to stands guiding the transmission housing, and the gliding elements contacting the front side of the saw blade, may be connected to each other by a carrier which, on its underside, has the form of a lower section of the saw blade and covers the lower soft blade section. The gliding elements, moreover, may also be contacting the front side of the saw blade and may be connected to each other by a carrier which is fastened to parts of rear gliding elements.

8 Claims, 5 Drawing Figures

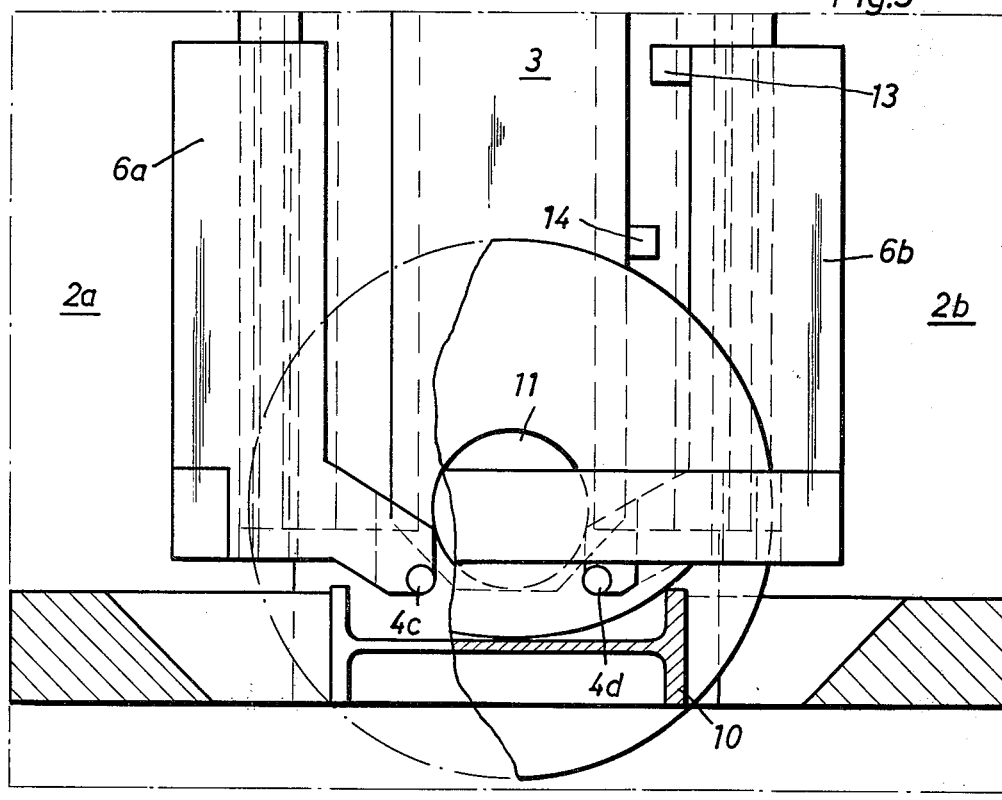
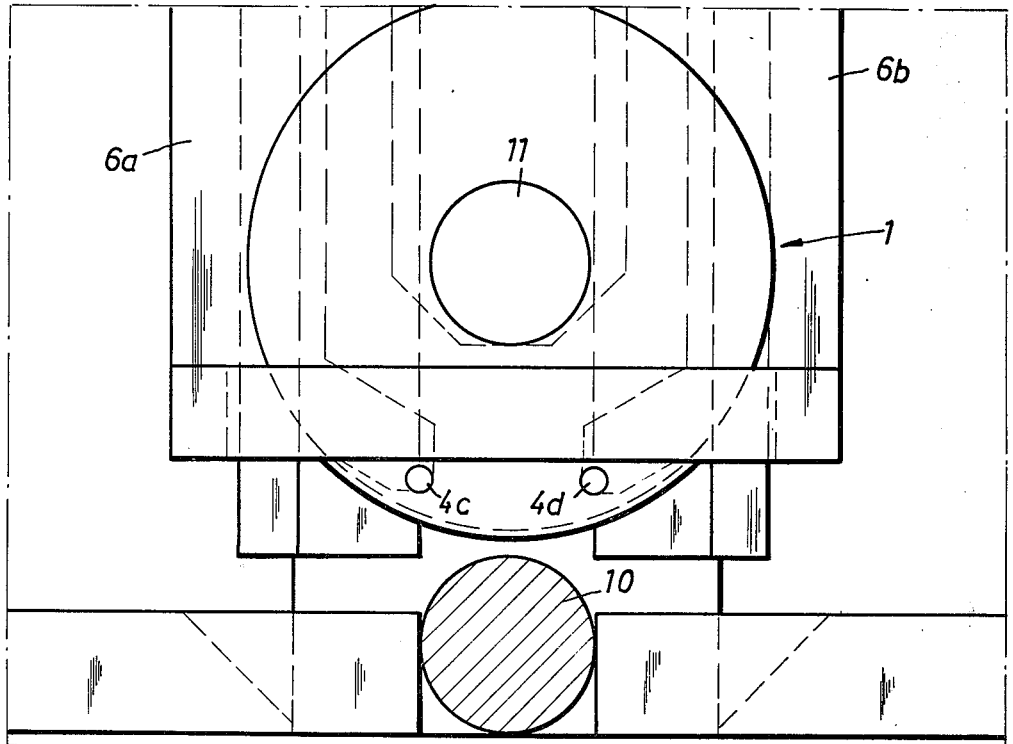

GUIDE FOR A SAWBLADE

BACKGROUND OF THE INVENTION

This invention relates to a machine for the cold sawing of workpieces, particularly those of metal. A vertical feed of the circular vertical saw blade is guided vertically by gliding elements adhering laterally to the saw blade. Cold circular saws, because the saw is thickener than with band or bow saws, cause greater material loss. If one wishes to work with relatively thin circular saws, it is necessary to guide the saw blade as close as possible to the place where it first makes contact with the material so that it does not run obliquely in the material. It is known to place two gliding elements each on both sides of a sawblade; these elements are fastened via holding parts on the transmission housing so that during vertical feed of the saw blade, they move with it vertically downward. Thus the gliding elements get into the vicinity of the workpiece so that there must be a distance of the width of the workpiece between them. Because of this distance, the gliding elements for many workpieces, e.g., round stock and double T beams, are frequently far removed from the point where the cut is started. Since the width of the workpiece changes frequently and the gliding elements should be as close as possible to the cutting point, a frequent adjustment of the gliding elements is necessary.

Because the gliding elements are at the side of the workpiece, the vises must have cutouts to accommodate the gliding elements with the holders, and these weaken the jaws. In addition, when making oblique cuts, the gliding elements must be far removed from the cutting location so that they lose their effectiveness.

It is the object of the present invention to provide a reliable guide for a saw blade near the cutting point.

SUMMARY OF THE INVENTION

This object is achieved by making the gliding elements movable relative to the saw blade, or relative to the saw blade drive parallel to the saw blade plane.

With the saw in accordance with the present invention, the gliding elements can be brought as close as desired to the point of first cut so that an absolute straight cut is ensured. During the deeper cutting of the saw into the material of the workpiece, the gliding elements remain above the material and the material itself does the guiding.

Since the gliding elements do not participate in the feed of the saw blade, they may be located above the workpiece and hence very close to the cutting put. The gliding elements are preferably fastened to vertical or oblique straight guides. Alternatively, the gliding elements may be fastened to guides with curved guide tracks. With the latter design, the guides may be steering points.

To achieve reliable hold, the guides are fastened to the stands carrying the transmission housing. To prevent contact of the gliding elements with the workpiece and hence a dirtying and damage to the gliding elements, the gliding elements contacting the forward side of the saw blade are connected by a carrier which, at its underside, has the form of the lower portion of the saw blade and covers the lower saw blade portion.

It is proposed that the gliding elements contacting the forward side of the saw blade are connected by a carrier (beam) which is fastened to the carrier parts of the rear gliding elements. To prevent a movement of the gliding elements underneath the lower edge of the saw blade at the carrier parts or guides of the gliding elements, there is at least one stop which, with the saw blade lifted from the workpiece, contacts a counter-stop on the transmission housing movable vertically with the saw blade. These stops may have limit switches whose purpose it is to disconnect the final feed of the saw blade and to turn on the saw feed.

BRIEF DESCRIPTION OF THE DRAWINGS

An embodiment of the invention is shown in sections in the drawing and is further described below.

FIG. 3 shows a front view after cutting through the workpiece with the saw blade partially cut away;
FIG. 4 shows a front view of the machine with the saw blade raised.

DESCRIPTION OF THE PREFERRED EMBODIMENTS

Figure 1:
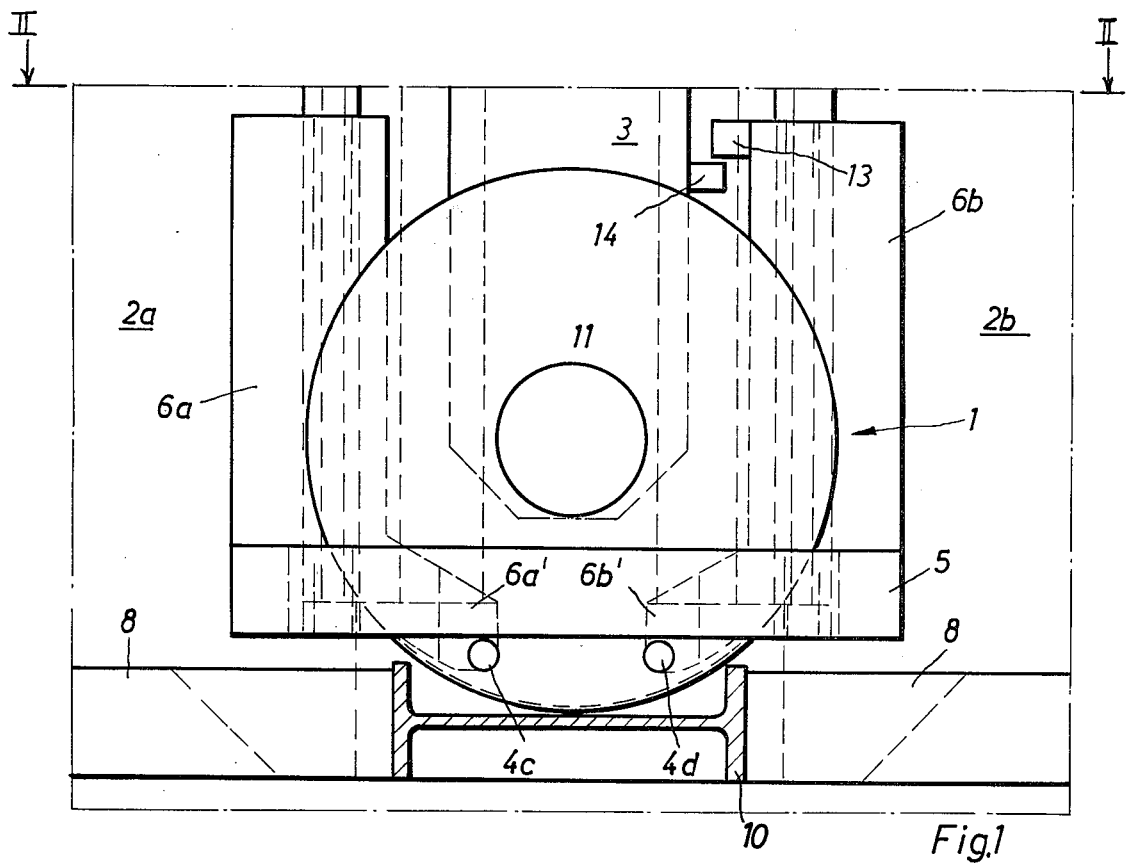
FIG. 1 shows a front view of the machine.
Figure 2:
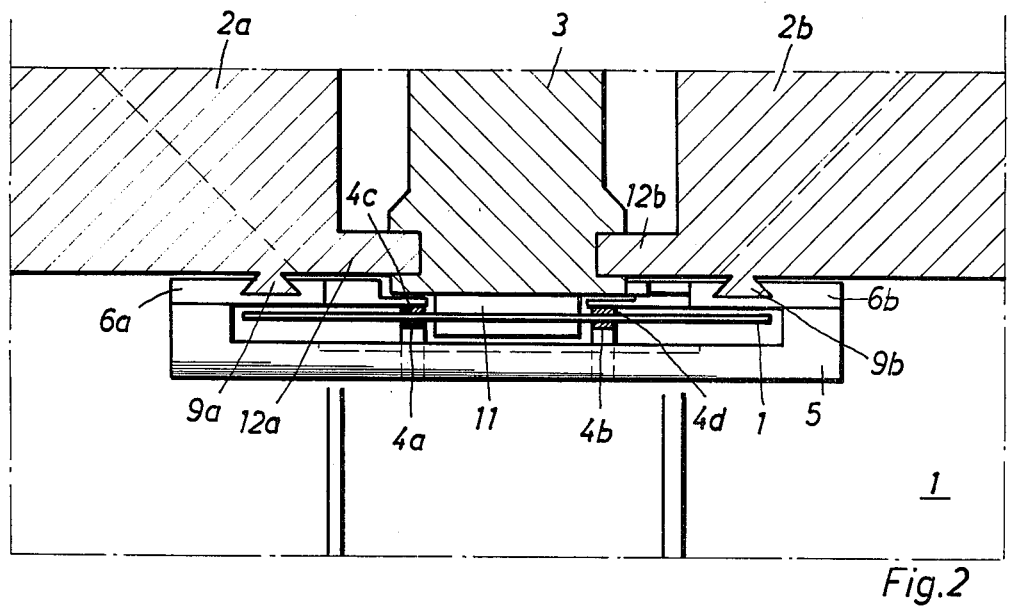
FIG. 2 shows a horizontal section taken along line II—II in FIG. 1.
Figure 5:
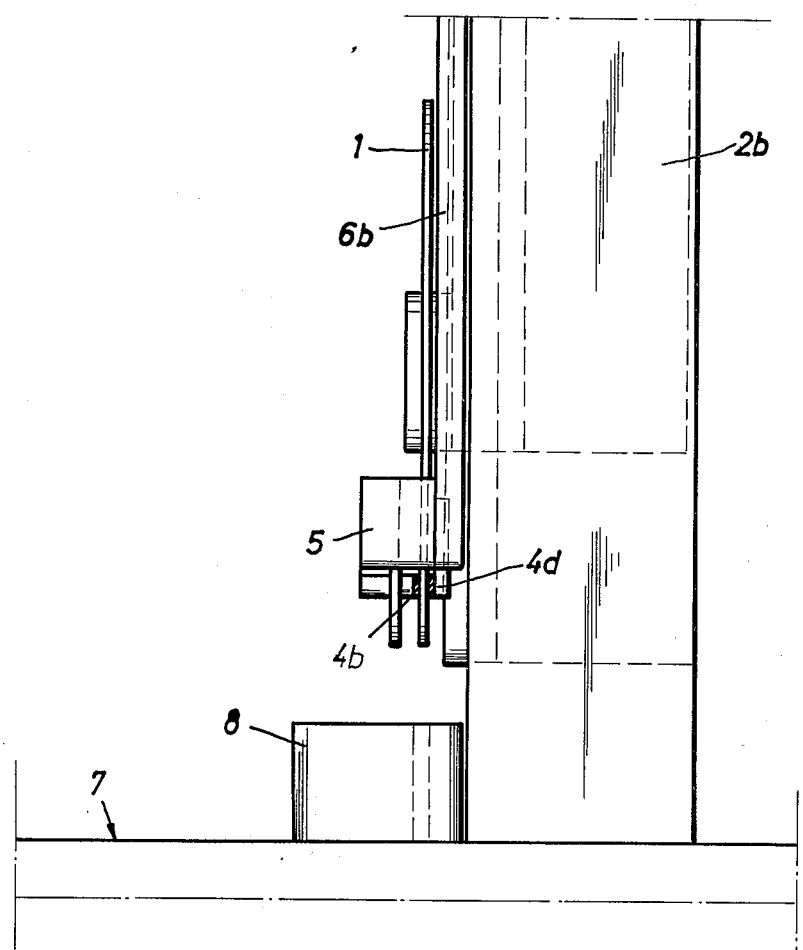
FIG. 5 shows a side view of the machine.

A vertically mounted saw blade 1 is fastened to the driveshaft of a transmission which is mounted in a transmission housing 3 including an electric motor. The transmission housing is guided by two guides 12a and 12b between two guide columns or stands 2a and 2b vertically movable, so that vertical feed of saw blade 1 is possible. The stands are fastened to a machine bed which on its top side, to form a movable table 7, has a horizontal plate. On the table 7, there are vise jaws 8 between which the workpiece 10 is held in such a way that it is centered underneath the saw blade.

On the front side of the saw blade 1, in the vicinity of the lower edge, a symmetrical about the vertical diameter of the saw blade, there are two forward gliding elements 4a and 4b in contact and which on the other side of the saw blade face two rear gliding elements 4c and 4d. The gliding elements 4a–d prevent sideways bending of the saw blade 1 during the cutting operation. The forward gliding elements 4a and 4b are fastened to a forward horizontal carrier 5 which is underneath the saw blade axis and is fastened on both sides of the saw blade 1, in an enclosing manner to the rear carriers 6a and 6b. The forward carrier 5 on its underside has a circle-segment-shaped part which is the same size or slightly larger than the lower section of the saw blade.

Between the saw blade and the stands 2a and 2b there are two unconnected rear carriers or carrier parts 6a and 6b which have arms 6a' and 6b' pointing inward and downward; at their ends the rear gliding elements 4c and 4d are fastened. The rear carriers 6a and 6b are guided vertically gliding on stands 2a and 2b by tongue and groove guides. For this purpose, the stands on their front side have dovetail vertical strips 9a and 9b which slide in vertical grooves of similar shape in the rear carriers 6a and 6b.

In order to make possible entry of the disk 11 necessary for mounting the saw blade (saw blade flange) between the ends of arms 6a' and 6b', the arm ends are spaced apart by a distance which is slightly larger than the diameter of disk 11. At the upper end of at least one of the rear carriers, is a stop 13 which points toward the transmission housing 3 and which, with the saw blade raised, contacts a counter-stop 14 of the transmission housing; thus the transmission housing takes along carriers 5, 6a and 6b in the upward direction and only after contact of the forward carrier 5 with the workpiece and after a rapid-feed of the saw blade to the workpiece, the stops disengage from each other, and via limit switches they disconnect the rapid feed and connect the saw feed.

I claim:

1. A machine for cold sawing of workpieces, particularly metallic workpieces, comprising:
   a circular vertical saw blade;
   vertical feed means for feeding said saw blade;
   gliding elements lying laterally against said saw blade for guiding said saw blade vertically;
   drive means for driving said saw blade;
   said gliding elements being guided movably relative to said saw blade and parallel to the plane of said saw blade.

2. A machine as defined in claim 1, wherein said gliding elements are located above said workpieces.

3. A machine as defined in claim 1, including carrier means; and guide means, said gliding elements being fastened by said carrier means to said guide means.

4. A machine as defined in claim 3, wherein said guide means comprises steering points.

5. A machine as defined in claim 4, including a transmission housing; stands for guiding said transmission housing, said guide means being fastened to said stands.

6. A machine as defined in claim 1, including carrier means having an underside conforming to a lower section of said saw blade and covering said lower section of said saw blade, said gliding elements contacting the front side of said saw blade and being connected to each other by said carrier means.

7. A machine as defined in claim 1, including carrier means; said gliding elements having rear gliding elements with carrier parts, said gliding elements contacting the front side of said saw blade being connected to each other by said carrier means, said carrier means being fastened to said carrier parts of said rear gliding elements.

8. A machine as defined in claim 1, including stop means for preventing movement of said gliding elements underneath the lower rim of said saw blade; counterstop means; a transmission housing movable vertically with said saw blade and mounting said counterstop means, said first-mentioned stop means contacting said counterstop means when said saw blade is raised from a workpiece.

* * * * *